US007322084B2

(12) United States Patent
Horsman

(10) Patent No.: US 7,322,084 B2
(45) Date of Patent: Jan. 29, 2008

(54) SPRING EXTENSION TOOL

(76) Inventor: Marc Wayne Horsman, 1710 Cody Dr., Billings, MT (US) 59105

(*) Notice: Subject to any disclaimer, the term of this patent is extended or adjusted under 35 U.S.C. 154(b) by 159 days.

(21) Appl. No.: 11/138,785

(22) Filed: May 26, 2005

(65) Prior Publication Data

US 2006/0265847 A1 Nov. 30, 2006

(51) Int. Cl.
*B23P 19/04* (2006.01)

(52) U.S. Cl. ............................ 29/225; 29/227; 29/267

(58) Field of Classification Search .................. 29/225, 29/227, 267; 254/10.5, 25, 119, 120, 131, 254/131.5; 7/100

See application file for complete search history.

(56) References Cited

U.S. PATENT DOCUMENTS 488,581 A * 12/1892 Smades et al. ............... 254/25
585,123 A * 6/1897 Severance ...................... 7/166
1,164,776 A * 12/1915 Arbanasin .................... 30/408
1,230,123 A * 6/1917 Connelly .................. 30/113.1
2,061,754 A * 11/1936 Casey ......................... 254/25
2,186,333 A * 1/1940 Giersch ....................... 254/25
2,272,362 A * 2/1942 Barker ........................ 254/25
3,341,175 A * 9/1967 Branick ..................... 254/10.5
4,375,259 A * 3/1983 Mancini et al. ............. 206/223
5,003,680 A * 4/1991 Vesely et al. ................. 29/227
5,095,603 A * 3/1992 Carruthers et al. ........... 29/227
5,495,651 A * 3/1996 Tsuha .......................... 29/235
5,507,083 A * 4/1996 Redgrave et al. ............. 29/227

* cited by examiner

*Primary Examiner*—David B Thomas
(74) *Attorney, Agent, or Firm*—Raymond M. Galasso; Galasso & Associates, LP

(57) ABSTRACT

A spring extension tool comprises a tool body and a tool positioning member. The tool body has two spaced apart fingers at a first end thereof and a lever attachment structure adjacent a second end thereof. The spaced apart fingers define a channel therebetween. A spring engagement face of each one of the fingers is inwardly sloping with respect to a straight longitudinal reference axis of the tool body. The tool positioning member is adjustably attached to the tool body such that a relative distance between the spaced apart fingers and the tool positioning member is adjustable.

8 Claims, 3 Drawing Sheets

SPRING EXTENSION TOOL

FIELD OF THE DISCLOSURE

The disclosures made herein relate generally to hand tools and, more particularly, to tools specifically configured for installing brake return springs.

BACKGROUND

It is common for motor vehicle repair technicians use a non-application specific tool to grasp and extend a brake system return spring (i.e., an extension-type return spring) into position. It is commonplace to use this approach for installing return springs in a S-cam type drum brakes. A set of locking pliers is an example of a non-application specific tool that is often used for installing such springs.

S-cam type drum brake systems are well known in the prior art as may be seen by reference to U.S. Pat. Nos. 2,369,259; 2,710,076; 3,096,856; 3,275,103; 3,398,814; 4,206,834; 4,260,042; 4,526,254; 4,552,254 and 4,905,800, the disclosures of which are hereby incorporated by reference. Because S-cam type drum brakes are generally used on heavy-duty commercial and industrial vehicles, the brake system components are large and heavy, thus requiring a high-rate extension-type return spring. The high rate results in the return spring being difficult to extend during installation using conventional approaches (i.e., using a non-application specific tool such as locking pliers to grasp and pull the spring). Because the high-spring rate causes a relatively large amount of energy to be stored in the return spring when it is extended, accidental disengagement of the spring from the non-application specific tool can result in injury to the person installing the spring and/or damage to other brake components.

Therefore, an approach for installing an extension spring such as a brake system return spring that overcomes drawbacks associated with conventional approaches for facilitating extension of extension springs would be useful, advantageous and novel.

SUMMARY OF THE DISCLOSURE

Embodiments of the present invention enable extension of a brake return spring to be safely and simply extended. More specifically, a spring extension tool in accordance with the present invention is specifically configured for using existing structure of a S-cam type brake system to facilitate installation of the return spring in such a brake system. With a pair of brake shoes of the brake system in place and a roller that typically resides between an S-cam and one of the brake shoes being removed, a spring extension tool in accordance with the present invention uses a surface of the S-cam as a fulcrum such that pivoting of the tool about the fulcrum enables a spring engaged with a fork-end of the tool to be extended and engaged with a mating structure of the brake system. Accordingly, the present invention advantageously overcomes one or more shortcomings associated with conventional approaches for installing extension springs and especially return springs in a S-cam type brake system.

In one embodiment of the present invention, a spring extension tool comprises a tool body having two spaced apart fingers. The spaced apart fingers define a channel therebetween. A spring engagement face of each one of the fingers is inwardly sloping with respect to a straight longitudinal reference axis of the tool body.

In another embodiment of the present invention, a spring extension tool comprises a tool body and a tool positioning member. The tool body has two spaced apart fingers at a first end thereof and a lever attachment structure adjacent a second end thereof. The spaced apart fingers define a channel therebetween. A spring engagement face of each one of the fingers is inwardly sloping with respect to a straight longitudinal reference axis of the tool body. The tool positioning member is adjustably attached to the tool body such that a relative distance between the spaced apart fingers and the tool positioning member is adjustable.

In another embodiment of the present invention, a spring extension tool comprises a tool body and a tool positioning member. The tool body having two spaced apart fingers. The spaced apart fingers define a channel therebetween. The tool body includes an integral elongated lever arm extending generally along the straight longitudinal reference axis. The tool positioning member is adjustably attached to the tool body such that a relative distance between the spaced apart fingers and the tool positioning member is adjustable.

Turning now to specific aspects of the present invention, in at least one embodiment, the spring engagement face of each one of the spaced apart fingers is curved.

In at least one embodiment of the present invention, the tool body includes an integral elongated lever arm extending generally along the straight longitudinal reference axis.

In at least one embodiment of the present invention, the lever attachment structure includes a rectangular lever attachment receptacle in a side face of tool body.

In at least one embodiment of the present invention, the lever attachment structure includes a lever attachment receptacle in an end face of the tool body.

In at least one embodiment of the present invention, the tool body includes a plurality of positioning member receptacles therein and each one of the positioning member receptacles is configured for having a tool positioning member selectively positioned therein.

These and other objects, embodiments advantages and/or distinctions of the present invention will become readily apparent upon further review of the following specification, associated drawings and appended claims.

DETAILED DESCRIPTION OF THE DRAWING FIGURES

Figure 1:
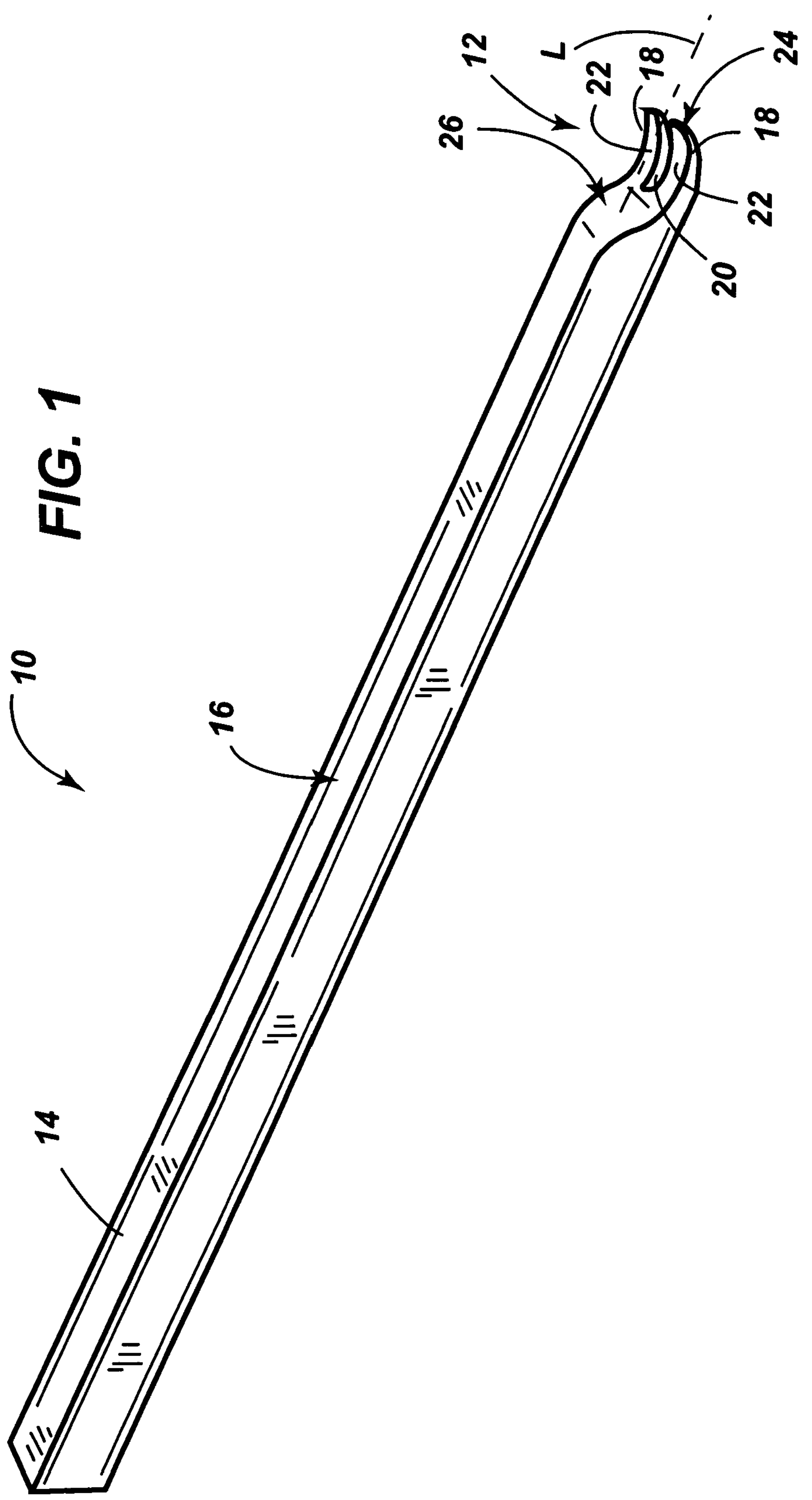
FIG. 1 depicts a first embodiment of a spring extension tool in accordance with the present invention.

FIG. 1 depicts a first embodiment of a spring extension tool in accordance with the present invention, which is generally referred to as the spring extension tool 10. The spring extension tool 10 includes a split fork portion 12 and an elongated lever arm 14 attached to the split fork portion 12. The elongated lever arm 14 and the spit fork portion 12 are integral elements of a tool body, which is generally depicted at reference numeral 16. In other embodiments (not specifically shown), the split fork portion 12 and/or the elongated lever arm 14 may be discrete components attached to the tool body 16. The elongated lever arm 14 extends generally along a straight longitudinal reference axis L of the tool body 16.

The split fork portion 12 includes two spaced apart fingers 18. A channel 20 extends between the spaced apart fingers 18. A spring engagement face 22 of each one of the fingers 18 is inwardly sloping with respect to the straight longitudinal reference axis L, thereby forming a spring body receiving pocket between a tip portion 24 of each finger and an inboard portion 26 of the tool body 16. As disclosed herein, inwardly sloping with respect to the straight longitudinal reference axis L is defined to mean that an axis that extends tangent to the engagement face 22 from the tip portion 24 will pass through the thickness of the tool body and/or the corresponding one of the fingers 18. In contrast, finger engagement faces of a conventional automotive split fork (e.g., a ball joint splitter) are outwardly skewed with respect to a straight longitudinal reference axis of such a tool, in that an axis that extends tangent to the engagement face 22 from the tip portion 24 will not pass through the thickness of the tool body and/or the corresponding finger.

In use, a spring body of a spring is urged into the spring body receiving pocket as the spring extension tool 10 is manipulated for installing the spring. Preferably, but not necessarily, the spring engagement face 22 of each one of the spaced apart fingers 18 is curved. Alternatively, the spring engagement face of each one of the spaced apart fingers 18 may be generally straight and/or flat.

Figure 2:
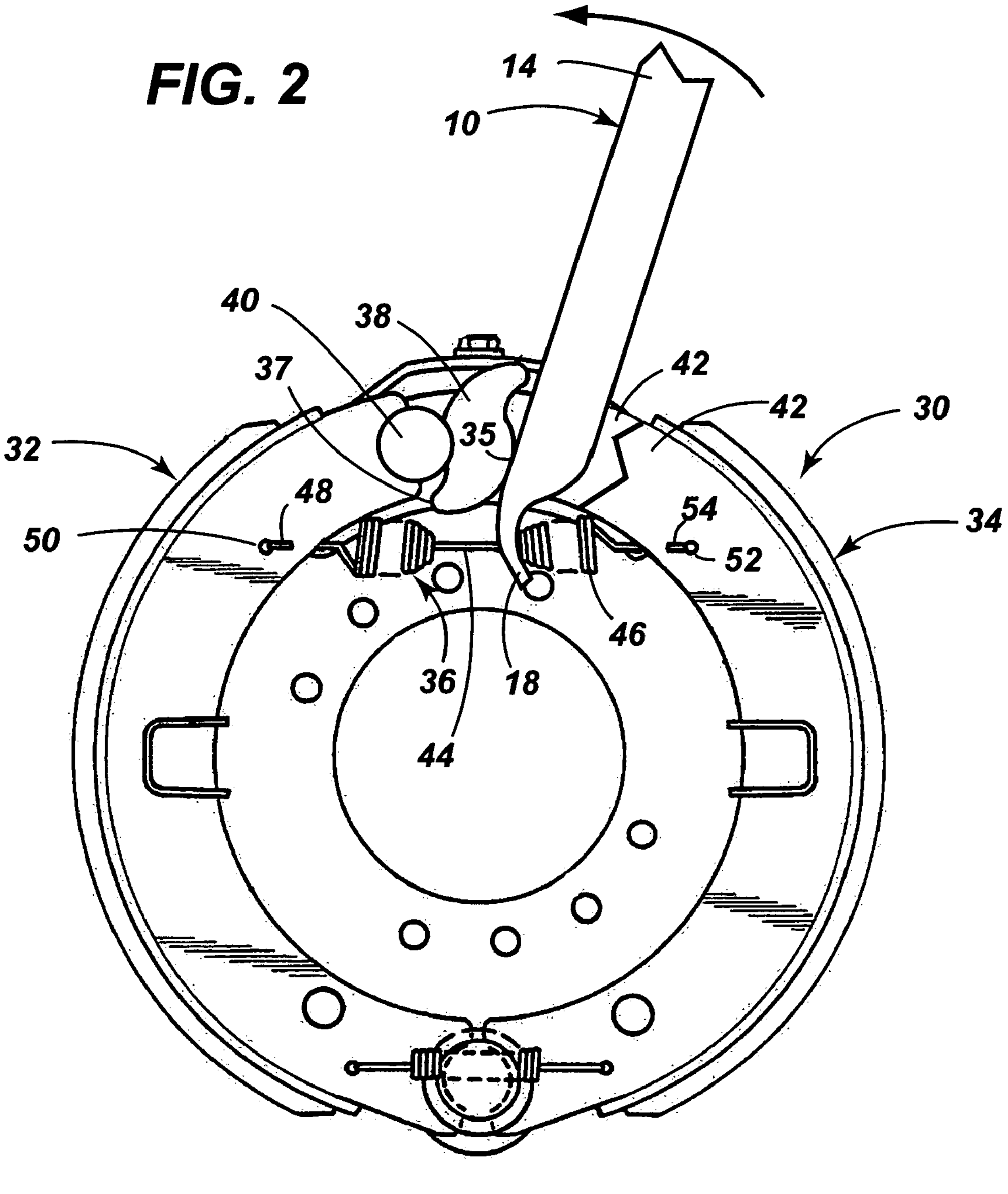
FIG. 2 depicts the spring extension tool of FIG. 1 in use with a conventional S-cam type brake system.

FIG. 2 depicts the spring extension tool 10 being used during servicing of a S-cam type brake system 30. The S-cam type brake system 30 depicted in FIG. 2 and its components are of a conventional (i.e., prior art) construction. Spring extension tools in accordance with the present invention are compatible with typical conventional S-cam type brake systems and do not require any modification to the brake system or its components. Accordingly, only those components and structure of the S-cam brake system 30 necessary to comprehend utility of a spring extension tool in accordance with the present invention are discussed herein.

Still referring to FIG. 2, the S-cam type brake system 30 includes a first brake shoe assembly 32, a second brake shoe assembly 34, a return spring 36 connected between the brake shoe assemblies (32, 34), an S-cam 38 centrally disposed between upper ends of the brake shoe assemblies (32, 34) and a roller 40 disposed between each brake shoe assembly (32, 34) and the S-cam 38. For enabling use of the spring extension tool 10, at least one of the rollers 40 is removed (as is depicted in FIG. 2) for enabling suitable positioning of the spring extension tool 10. Preferably, both rollers 40 are removed prior to installation of the returns spring 36. Each one of the brake shoe assemblies (32, 34) includes spaced apart mounting plates 42 (one shown fragmented for clarity).

The spring extension tool 10 is positioned between the spaced apart mounting plates 42 with a link member 44 of the return spring 36 extending through the channel 20 (FIG. 1) between the fingers 18 of the spring extension tool 10 and a spring body 46 engaged by the spring engagement face 22 (FIG. 1) of each finger 18. With a first end 48 of the return spring 36 engaged in a respective mounting hole 50 of the first brake show assembly 32, the spring extension tool 10 is rotated such that the spring extension tool 10 bears against the S-cam 38. With the S-cam 38 serving as a fulcrum, continued rotation of the spring extension tool 10 extends the return spring 36 such that a second end 52 of the return spring 36 is safely and readily engaged with a mounting hole 54 of the second brake shoe assembly 34. Thereafter, the spring extension tool 10 is removed and one or both rollers 40 are installed between the S-cam 38 and the second brake shoe assembly 34.

As depicted in FIG. 2, a camming surface 35 of the S-cam 38 serves as the contact surface with the spring extension tool 10. Alternately, a tip surface 37 of the S-cam 38 may serve as the contact surface with the spring extension tool 10.

Figure 3:
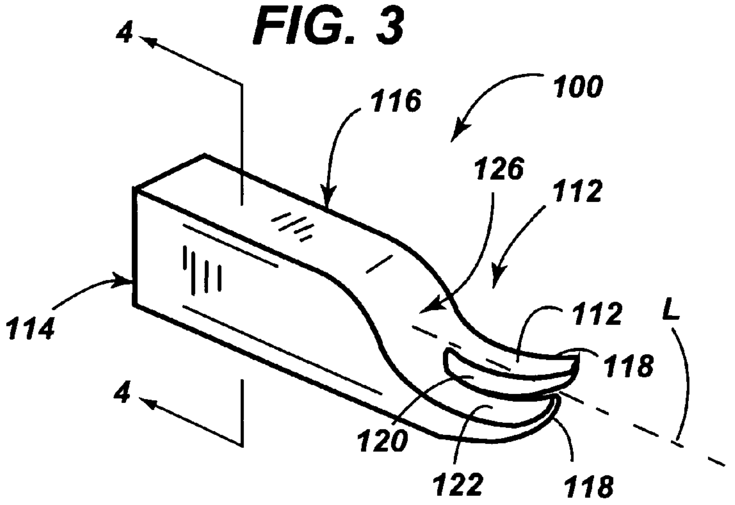
FIG. 3 depicts a second embodiment of a spring extension tool in accordance with the present invention.
Figure 4:
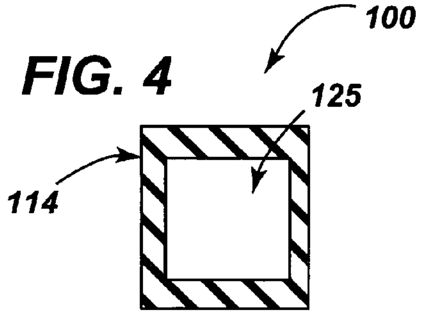
FIG. 4 is a cross-sectional view taken along the line 4-4—in FIG. 3.

FIGS. 3 and 4 depict a second embodiment of a spring extension tool in accordance with the present invention, which is generally referred to as the spring extension tool 100. The spring extension tool 100 includes a split fork portion 112 and a lever attachment portion 114. The split fork portion 112 and the lever attachment portion 114 are integral elements of a tool body, which is generally depicted at reference numeral 116. In other embodiments (not specifically shown), the split fork portion 112 and/or the lever attachment portion 114 may be discrete components attached to the tool body 116. The lever attachment portion 114 extends generally along a straight longitudinal reference axis L of the tool body 116.

The split fork portion 112 includes two spaced apart fingers 118. A channel 120 extends between the spaced apart fingers 118. A spring engagement face 122 of each one of the fingers 118 is inwardly sloping with respect to the straight longitudinal reference axis L, thereby forming a spring body receiving pocket between a tip portion 124 of each finger and an inboard portion 126 of the tool body 116. In use, a spring body of a spring is urged into the spring body receiving pocket as the spring extension tool 100 is manipulated for installing the spring. Preferably, but not necessarily, the spring engagement face 122 of each one of the spaced apart fingers 118 is curved. Alternatively, the spring engagement face 122 of each one of the spaced apart fingers 118 may be generally flat.

The lever attachment portion 114 includes a lever attachment receptacle 125. The lever attachment receptacle 125 extends through an end face of the tool body 116. The lever attachment receptacle 125 is configured for receiving a suitable lever. In this manner, the length of an attached discrete lever provides leverage for facilitating operation of the spring extension 100. As depicted, the lever attachment receptacle 125 has a generally square cross-sectional profile suitable for engaging an end of an elongated lever such as, for example, a socket extension. Optionally, the lever attachment receptacle 125 may have a different cross sectional shape (e.g. circular). Preferably, the overall length of th tool body 116 is sufficiently long to ensure that the tool body 116 engages the S-cam rather than the lever attached to the tool body 116.

Figure 5:
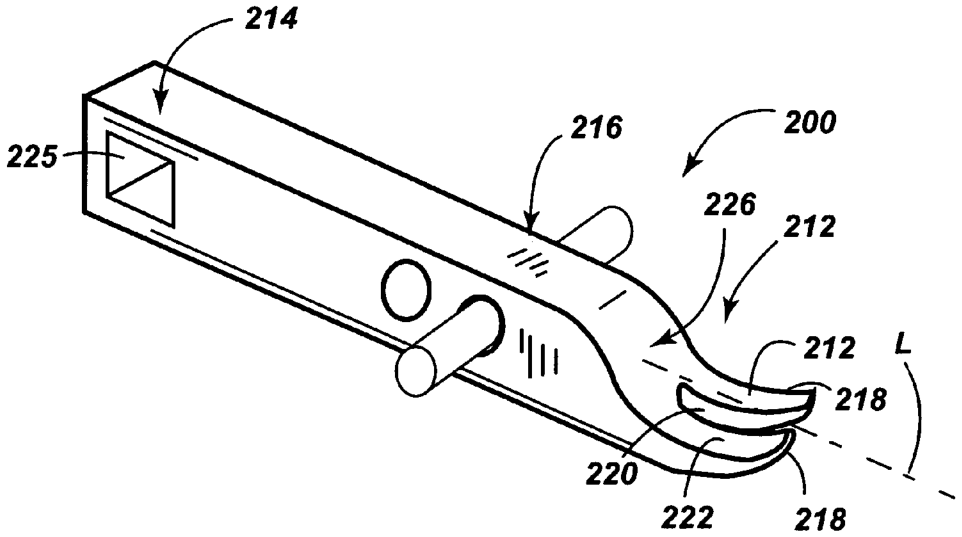
FIG. 5 depicts a third embodiment of a spring extension tool in accordance with the present invention.

FIG. 5 depicts a third embodiment of a spring extension tool in accordance with the present invention, which is generally referred to as the spring extension tool 200. The spring extension tool 200 includes a split fork portion 212 and a lever attachment portion 214. The split fork portion 212 and the lever attachment portion 204 are integral elements of a tool body, which is generally depicted at reference numeral 216. In other embodiments (not specifically shown), the split fork portion 212 and/or the lever attachment portion 214 may be discrete components attached to the tool body 216. The lever attachment portion 214 extends generally along a straight longitudinal reference axis L of the tool body 216.

The split fork portion 212 includes two spaced apart fingers 218. A channel 220 extends between the spaced apart fingers 218. A spring engagement face 222 of each one of the fingers 218 is inwardly sloping with respect to the straight longitudinal reference axis L, thereby forming a spring body receiving pocket between a tip portion 224 of each finger and an inboard portion 226 of the tool body 216. In use, a spring body of a spring is urged into the spring body receiving pocket as the tool is manipulated for installing the spring. Preferably, but not necessarily, the spring engagement face 222 of each one of the spaced apart fingers 218 is curved. Alternatively, the spring engagement face 222 of each one of the spaced apart fingers 218 may be generally flat.

The lever attachment portion 214 includes a lever attachment receptacle 225. The lever attachment receptacle 225 extends through a side face of the tool body 216. The lever attachment receptacle 225 is configured for receiving a suitable lever. In this manner, the length of an attached discrete lever allows provides leverage for facilitating operation of the spring extension tool 200. As depicted, the lever attachment receptacle 225 has a generally square cross-sectional profile suitable for engaging a socket mounting member of a ratchet wrench or breaker bar. Optionally, the lever attachment receptacle 225 may have a different cross sectional shape (e.g., star-shaped, triangular, etc) capable of transmitting a torsional force. Preferably, the overall length of the tool body 216 is sufficiently long to ensure that the tool body 216 engages the S-cam rather than the lever attached to the tool body 216.

The spring extension tool 200 further includes a tool positioning member 227 attached to the tool body 216. The tool positioning member engages one or more components of a brake system (e.g., the spaced apart mounting plates 42 of the S-cam type brake system depicted in FIG. 2) for positively positioning the spring extension tool 200 relative to an extension spring.

Still referring to FIG. 5, a plurality of spaced apart positioning member receptacles 229 are extend laterally through the tool body 216. Each one of the positioning member receptacles 229 is configured for having the tool positioning member 227 selectively positioned therein such that a relative distance between the spaced apart fingers 218 and the tool positioning member 227 is adjustable. As depicted in FIG. 5, each one of the positioning member receptacles 229 is a passage with a generally round cross section and the tool positioning member 227 is an elongated pin having a generally round cross section. A retention arrangement of a known type (e.g., a spring-loaded ball and mating detent) may be used for preventing unintentional withdrawal of the tool positioning member 227 from an engaged one of the positioning member receptacles 229.

It is disclosed herein that a tool positioning arrangement (e.g., the tool positioning member 227) may be incorporated into other embodiments of spring extension tools in accordance with the present invention, besides the spring extension tool 200 depicted in FIG. 5. Furthermore, it is disclosed herein that such a tool positioning arrangement may be non-adjustable and/or non-removable.

Preferably, but not necessarily, spring extensions tools in accordance with the present invention are made from hardened tool steel. For professional use, hardened tool steel will provide for durable wear surfaces, extreme rigidity and overall strength. However, it is disclosed herein that that spring extensions tools in accordance with the present invention may alternatively be made from other materials such as, for example, plastic, aluminium or non-hardened steel.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A spring extension tool, comprising:

a tool body having two spaced apart fingers, wherein a channel is defined between said spaced apart fingers and wherein a spring engagement face of each one of said fingers is inwardly sloping with respect to a straight longitudinal reference axis of the tool body; and a lever attachment structure comprising a rectangular lever attachment receptacle in a side face of tool body.

2. The tool of claim 1 wherein the spring engagement face of each one of said spaced apart fingers is curved.

3. The tool of claim 1, further comprising:

a tool positioning member attached to the tool body.

4. The tool of claim 1 wherein:

the spring engagement face of each one of said spaced apart fingers is curved; and the tool body includes an integral elongated lever arm extending generally along the straight longitudinal reference axis.

5. The tool of claim 4 further comprising:

a tool positioning member attached to the tool body.

6. A spring extension tool, comprising:

a tool body having two spaced apart fingers at a first end thereof and a lever attachment structure adjacent a second end thereof wherein the lever attachment structure includes a rectangular lever attachment receptacle in a side face of tool body, wherein a channel is defined between said spaced apart fingers and wherein a spring engagement face of each one of said fingers is inwardly sloping with respect to a straight longitudinal reference axis of the tool body; and a tool positioning member adjustably attached to the tool body such that a relative distance between said spaced apart fingers and the tool positioning member is adjustable.

7. The tool of claim 6 wherein:

the spring engagement face of each one of said spaced apart fingers is curved.

8. The tool body of claim 6 wherein:

the tool body includes a plurality of positioning member receptacles therein; and each one of said positioning member receptacles is configured for having a tool positioning member selectively therein.

* * * * *